United States Patent
Jain et al.

(10) Patent No.: US 9,860,157 B2
(45) Date of Patent: Jan. 2, 2018

(54) ZERO CONFIGURATION APPROACH FOR PORT FORWARDING CASCADED ROUTERS

(71) Applicant: Sling Media PVT Ltd, Bangalore (IN)

(72) Inventors: Vikal Kumar Jain, Bangalore (IN); Vivek Maran, Tamil Nadu (IN); Karthik Vennakottumadam Raman, Kalyan Nagar (IN)

(73) Assignee: Sling Media PVT Ltd, Bangalore (IN)

( * ) Notice: Subject to any disclaimer, the term of this patent is extended or adjusted under 35 U.S.C. 154(b) by 160 days.

(21) Appl. No.: 14/848,529

(22) Filed: Sep. 9, 2015

(65) Prior Publication Data

US 2017/0070417 A1    Mar. 9, 2017

(51) Int. Cl.
*H04L 12/751* (2013.01)
*H04L 12/733* (2013.01)
*H04L 12/24* (2006.01)
*H04L 29/08* (2006.01)

(52) U.S. Cl.
CPC .............. *H04L 45/02* (2013.01); *H04L 45/20* (2013.01); *H04L 29/08315* (2013.01); *H04L 29/08648* (2013.01); *H04L 41/12* (2013.01); *H04L 67/1042* (2013.01)

(58) Field of Classification Search
CPC ... H04L 45/02; H04L 45/20; H04L 29/08648; H04L 41/126; H04L 29/08315; H04L 12/2416; H04L 67/1042
See application file for complete search history.

(56) References Cited

U.S. PATENT DOCUMENTS

| | | | |
|---|---|---|---|
| 6,377,987 B1 * | 4/2002 | Kracht | ................ H04L 41/0213 370/254 |
| 7,839,807 B2 | 11/2010 | Kokado | |
| 7,873,037 B2 | 1/2011 | Gobara et al. | |
| 7,881,231 B2 | 2/2011 | Qian et al. | |
| 7,933,273 B2 | 4/2011 | Takeda et al. | |
| 8,000,280 B2 | 8/2011 | Takechi et al. | |
| 8,116,234 B2 | 2/2012 | Qian et al. | |
| 8,341,207 B2 | 12/2012 | Werner et al. | |
| 8,412,833 B2 | 4/2013 | Vyrros et al. | |
| 8,438,294 B2 | 5/2013 | Lampell et al. | |
| 8,565,190 B2 | 10/2013 | Takeda et al. | |
| 8,769,278 B2 | 7/2014 | Abuan et al. | |
| 8,819,244 B2 | 8/2014 | Tung et al. | |
| 2002/0161879 A1 * | 10/2002 | Richard | .............. H04L 41/0213 709/223 |
| 2005/0018647 A1 * | 1/2005 | Lebrun | ............. H04L 29/12009 370/351 |

(Continued)

*Primary Examiner* — Warner Wong
(74) *Attorney, Agent, or Firm* — Bejin Bieneman PLC

(57) ABSTRACT

Transmission of an open systems interconnection (osi) network protocol packet to at least one routing device between a computing device and a public network is repeated to learn a number of routing devices and an internet protocol (ip) address of each at least one routing device between a computing device and a public network. A routing device discovery protocol request is sent to each at least one routing device. A routing device discovery protocol response is received. A port forwarding instruction is sent to each at least one routing device based upon the routing device discovery protocol response to allow incoming content from the public network.

23 Claims, 5 Drawing Sheets

(56) References Cited

U.S. PATENT DOCUMENTS

| | | | |
|---|---|---|---|
| 2006/0098586 A1* | 5/2006 | Farrell | H04L 41/12 370/254 |
| 2006/0126528 A1* | 6/2006 | Ramalho | H04L 29/06027 370/252 |
| 2008/0019367 A1* | 1/2008 | Ito | H04L 29/12009 370/392 |
| 2008/0107107 A1* | 5/2008 | Shen | H04L 45/52 370/389 |
| 2008/0123646 A1 | 5/2008 | Gobara et al. | |
| 2009/0028167 A1 | 1/2009 | Takeda et al. | |
| 2009/0116499 A1* | 5/2009 | Kokado | H04L 12/2838 370/401 |
| 2010/0014529 A1 | 1/2010 | Takechi et al. | |
| 2010/0208620 A1 | 8/2010 | Qian et al. | |
| 2011/0125897 A1 | 5/2011 | Qian et al. | |
| 2011/0200009 A1 | 8/2011 | Takeda et al. | |
| 2011/0252079 A1 | 10/2011 | Vyrros et al. | |
| 2011/0252144 A1 | 10/2011 | Tung et al. | |
| 2011/0252145 A1 | 10/2011 | Lampell et al. | |
| 2011/0252238 A1 | 10/2011 | Abuan et al. | |
| 2012/0011189 A1 | 1/2012 | Werner et al. | |
| 2012/0246301 A1 | 9/2012 | Vyrros et al. | |
| 2013/0110938 A1 | 5/2013 | Werner et al. | |
| 2013/0227019 A1 | 8/2013 | Vyrros et al. | |
| 2014/0365770 A1 | 12/2014 | Abuan et al. | |
| 2017/0195221 A1* | 7/2017 | Xiao | H04L 45/70 |

* cited by examiner

| Layer | | Data unit | Function | Examples |
|---|---|---|---|---|
| Host Layer | 7. Application | Data | High-level APIs, including resource sharing, remote file access, directory services and virtual terminals | Mail, Internet Explorer, Firefox |
| | 6. Presentation | | Translation of data between a networking service and an application; including character encoding, data compression and encryption/decryption | ASCII, EBCDIC, JPEG |
| | 5. Session | | Managing communication sessions, i.e. continuous exchange of information in the form of multiple back-and-forth transmissions between two nodes | RPC, PAP, HTTP, FTP, SMTP, Secure Shell |
| | 4. Transport | Segments | Reliable transmission of data segments between points on a network, including segmentation, acknowledgement and multiplexing | TCP, UDP |
| Media Layer | 3. Network | Packet/ Datagram | Structuring and managing a multi-node network, including addressing, routing and traffic control | IPv4, IPv6, IPsec, AppleTalk, ICMP |
| | 2. Data link | Bit/Frame | Reliable transmission of data frames between two nodes connected by a physical layer | PPP, IEEE 802.2, L2TP |
| | 1. Physical | Bit | Transmission and reception of raw bit streams over a physical medium | DSL, USB |

FIG. 2

ZERO CONFIGURATION APPROACH FOR PORT FORWARDING CASCADED ROUTERS

BACKGROUND

Routers often implement Network Address Translation (NAT) protocol to remap a set of private Internet Protocol (IP) addresses within a network into a single globally unique public IP address that is routable on the Internet. The technique was originally used for ease of rerouting traffic in IP networks without renumbering every host computer. NAT remapping has become a tool in conserving global address space allocations in the face of Internet Protocol version 4 (IPv4) address exhaustion. A NAT router creates a Local Area Network (LAN) of private IP addresses and interconnects that LAN to a Wide Area Network (WAN), i.e., the Internet.

One of the key benefits of NAT routers is that the router appears to the Internet as a single machine with a single IP address. This effectively masks the fact that many computers on the LAN side of the router may be simultaneously sharing that single IP address. In addition to conserving global addresses, NAT also provides additional security by abstracting and isolating devices in the network from direct access from the Internet. This abstraction imposes restrictions on the access to the internal network devices with private IP addresses connected behind one or more routers, as the routers incoming ports are usually closed, i.e., the routers will not permit incoming packets from an outside network. In order to make the internal network device accessible from the Internet, the router implementing NAT must be configured to have an entry to forward the inbound traffic received on a specific port number of the router to an internal IP address and port combination. This process is referred to as port-forwarding.

Currently, there are protocols such as Universal Plug and Play (UPnP) protocol and/or Network Address Translation Port Mapping Protocol (NATPMP) that provide for manually configuring port forwarding in networks where there is only one router connected between an internal device (one in the private network) and a public network, e.g., the Internet. Unfortunately, present mechanisms for automatically configuring cascaded routing devices are lacking due to the current limitations of presently available automatic detection and routing systems.

BRIEF DESCRIPTION OF THE DRAWINGS

FIG. 2 illustrates the seven layers of the OSI model starting with the lowest level hierarchy (Physical) proceeding to the highest layer (Application).

DETAILED DESCRIPTION

Figure 1:
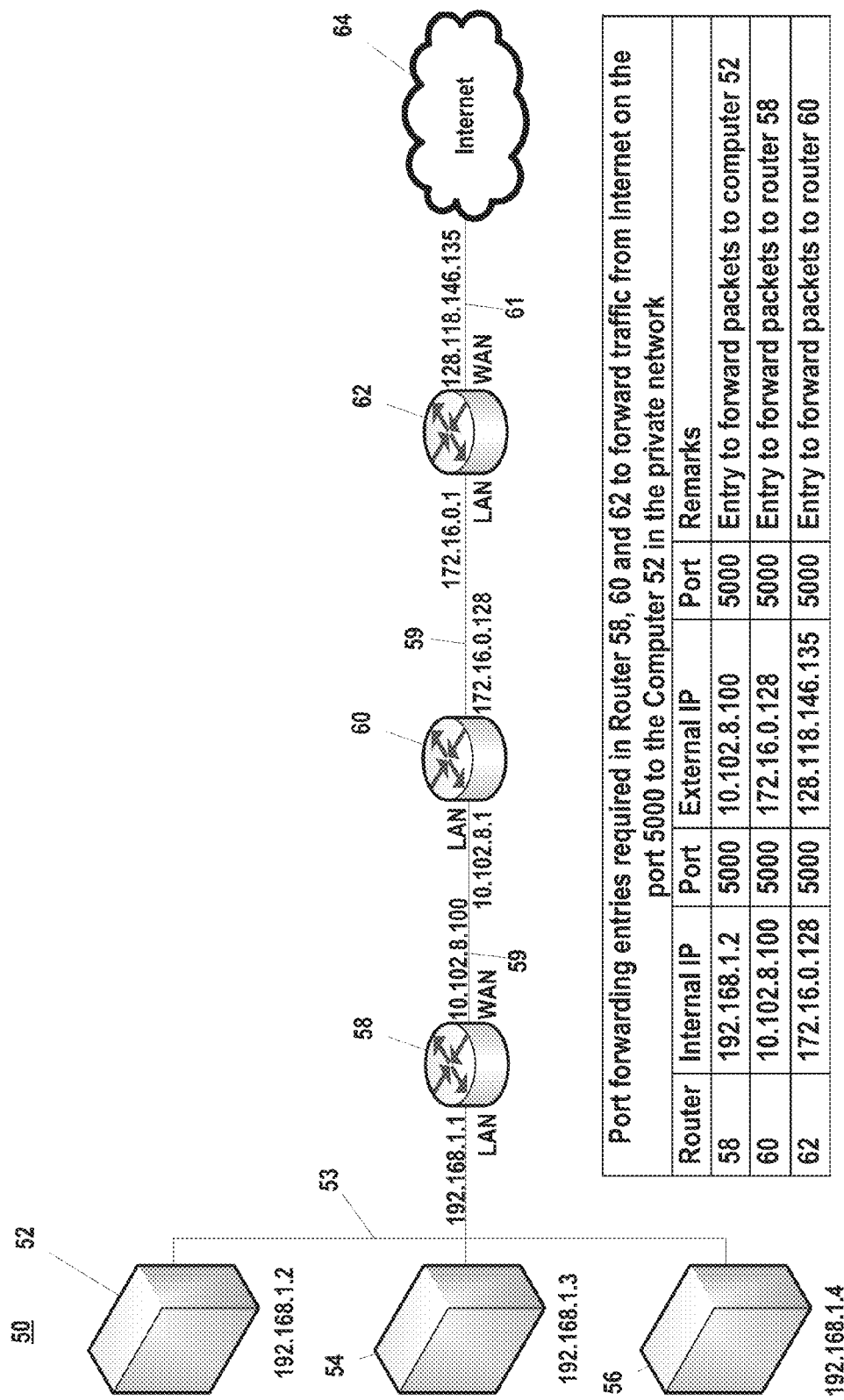
FIG. 1 is an example of a network address map illustrating port-forwarding cascaded routers connecting a computing device to an external network including a port forwarding table with an example of port forwarding settings.

Turning to the Figures, wherein like numerals indicate like parts throughout the several views FIG. 1 illustrates an example of a system of computing device 52 connected to the Internet 64 through routing device 58 60 62 which implement Network Address Translation (NAT). In order for the computing device 52 to receive inbound communications from the Internet 64, the routing device 58 60 62 must be configured for port forwarding. The computing device 52 includes a processor and a memory, the memory storing programs executable by the processor in the computing device 52. Additionally, the computing device IP address is 192.168.1.2 and the routing device 58 has a LAN IP address of 192.168.1.1. The routing device 58 is connected to the router 60 via a network 59. The routing device 58 has a WAN IP address of 10.102.8.100 and the router 60 has a LAN IP address of 10.102.8.1. The router 60 is connected to the router 62. The router 60 has a WAN IP address of 176.16.0.128 and the router 62 has a LAN address of 172.16.0.1. The router 62 is connected to the Internet 64 with a WAN IP address of 128.118.146.135.

In order for a packet to "come in" from the Internet 64 and reach the computing device 52, the routing device 58 60 62 must have ports opened up to permit incoming packets from the internet 64. This technique is known as port forwarding. A port is a logical number which is 16 bits wide that is used along with the IP address to uniquely identify the endpoint of a TCP/IP connection. Port forwarding, also known as port mapping, is a NAT procedure that redirects a communication request from one address and port number combination to another while the packets are traversing a network gateway, such as through the routing device 58 60 62. This technique is used to allow applications or services executing on the computing device 52, which resides on a LAN side of the routing device, in this example, network 53 to receive packets from the Internet 64. The table in FIG. 1 is an example of the routing device 58 60 62 port forwarding settings to allow the computing device 52 to receive incoming packets from the Internet 64.

In an exemplary embodiment, the computing device 52 can execute program instructions for zero configuration of the port forwarding to allow the computing device 52 to receive incoming packets from the Internet 64 via a three-phase process. The first phase includes the computing device 52 learning the network topology of the one or more routing device 58 60 62 connected between the computing device 52 and the Internet 64. Network topology is the arrangement of the various elements (routers, links, nodes, etc.) of a computing device network.

The second phase is issuing a discovery request based on one or more networking protocols of the routing device learnt to be present between the computing device 52 and the Internet 64. The response to the discovery request will determine the type of the protocol implemented in those routing devices. For example, a UPnP discovery packet and/or NATPMP discovery packet is sent to each discovered routing device 58, 60, 62. If the routing device 58 60 62 can use either protocol, the routing device 58 60 62 will send back an affirmative response to the query. A third phase includes actually sending port entry configurations to the UPnP or the NATPMP capable routers. Besides routing device 58, 60, 62, networking devices include gateways, bridges, or any IP layer device implementing NAT.

Phase 1—Learning the Router Topology

The Open Systems Interconnection (OSI) model is a well-known conceptual model that characterizes and standardizes the communication functions of a telecommunication or computing system without regard of their underlying internal structure and technology. Its goal is the interoperability of diverse communication systems with standard protocols. The model partitions a communication system into abstraction layers.

The OSI model comprises seven layers and each layer serves the layer above it and is served by the layer below it. For example, a layer that provides error-free communications across a network provides the path needed by applications above it, while it calls the next lower layer to send and receive an OSI network protocol packets that comprise the contents of that path. FIG. 2 illustrates the seven layers of the OSI model starting with the lowest level hierarchy (Physical) proceeding to the highest layer (Application).

A User Datagram Protocol (UDP) packet is used to learn the routing device 58 60 62 topology between the computing device 52 and the Internet 64. UDP is in the layer 4 (Transport) of the OSI model. UDP uses a simple connectionless transmission model with a minimum of protocol mechanism, i.e., UDP packets do not expect a reception acknowledgement from the destination. An Internet Protocol (IP) layer encapsulates the UDP packet, and the IP layer contains a header with a field known as Time to Live (TTL) or hop limit, which measures the number of hops the packet is allowed to travel before reaching its final destination. For example, the TTL is an 8-bit field in the IP packet and therefore has a maximum value of 255. A hop is one portion of the path between a source and a destination of a data packet. For example, whenever the data packet passes through a IP layer device such IP layer device, a hop occurs.

Each routing device 58 60 62 through which the packet travels, decrements the TTL value by 1, and when the TTL value reaches 0, the packet is discarded by the device and an Internet Control Message Protocol (ICMP) (which is a level 3 (Network) message layer message) Time Exceeded Message (TEM) is sent from the current network device 58 60 62 to the source of the packet indicating that the packet was dropped. For example, if the computing device 52 sends a packet with a TTL value of two, after two hops, which is through two network routers, the TTL value will then be zero. The routing device currently being traversed by the packet disregards the packet and sends the TEM message to the computing device 52 indicating the message expired en route. ICMP is used by network devices, like routers, to send messages indicating that a requested service is not available or that a host or router could not be reached.

The TTL's behavior in a packet switching network can be used to learn the routing device 58 60 62 topology. A series of probe packets with incremental TTL values that are intended to expire at each routing device 58 60 62 along the way from the computing device 52 to the internet 64 are sequentially transmitted. A received ICMP 'Time Exceeded Message' response from the routing device 58, 60, 62 are collected by the computing device 52 and parsed to obtain an IP addresses of each routing device 58, 60, 62 and a number of routing devices.

The incrementing TTL process is continued until a public network address is encountered in the return ICMP 'Time Exceeded Message' message. The public IP address space is a set of IP addresses which indicate that the network is on the Internet. Public addresses can be assigned by an Network Information Center, which guarantees the IP address to be globally unique to the Internet, whereas a private IP address space indicates the network is not on the open Internet. Private addresses are set by convention to start with a "10," a "172" or a "192" octet as their network designation. For example, private IP addresses can include 10.128.122.244, 172.22.1.127 and 192.168.1.133. The IP addresses within these three ranges are forbidden for use on the public Internet. They can, therefore, be freely used, and re-used, within any private network without fear that any machine on the public Internet might be using the same IP as one on a private network. Table 1 is a list of private IP addresses available to private networks.

TABLE 1

| Network Designation | First Address | Last Address | Number of Addresses |
|---|---|---|---|
| 192.168.0.0/16 | 192.168.0.0 | 192.168.255.255 | 65,536 |
| 172.16.0.0/12 | 172.16.0.0 | 172.31.255.255 | 1,048,576 |
| 10.0.0.0/8 | 10.0.0.0 | 10.255.255.255 | 16,777,216 |

Figure 3:
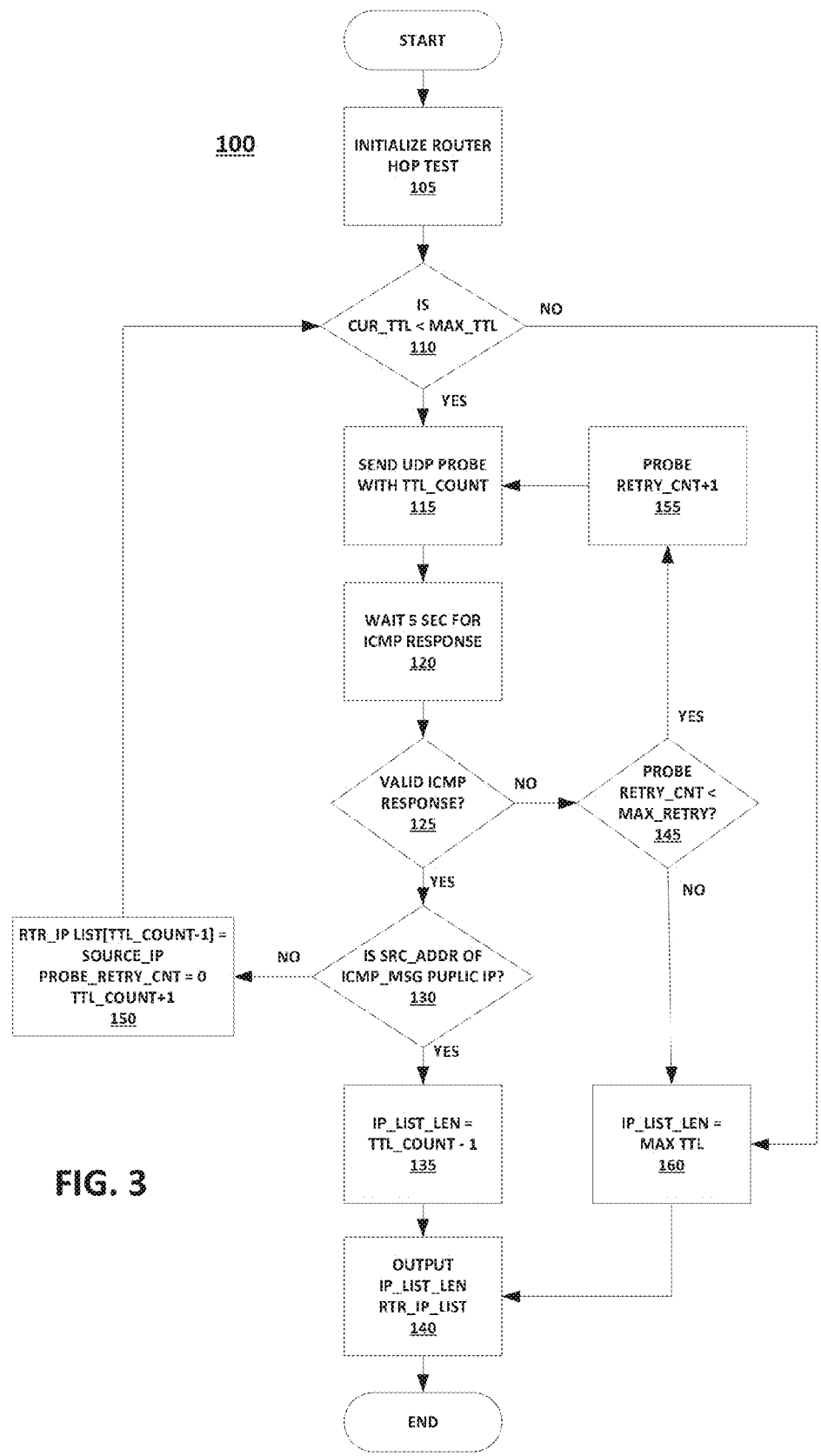
FIG. 3 is an example of a process executed on the computing device of FIG. 1 to learn the network topology information, such as Internet Protocol (IP) address of one or more routers between the computing device and the Internet.

FIG. 3 illustrates an example process 100 executed on a computing device 52 to learn the network topology information of one or more routing device 58 60 62 between the computing device and the external network.

The process 100 begins in a block 105, in which a TTL hop test is initiated. A current TTL value is set to 1, a max TTL value is set to 256, an IP list length value is set to a zero, a probe retry count is set to a zero, a router IP list array is initialized, and a max probe retry count can be any number, for example a value of two.

Next, in a block 110, the current TTL value is compared to the max TTL level. If the current TTL value is less than the max TTL level value, the process 100 continues in a block 115; otherwise, the process 100 continues in a block 160.

In the block 115, a User Datagram Protocol (UDP) probe with the current TTL value in the IP header is sent from the computing device 52. Next, in a block 120, the computing device 52 waits a predetermined time for the reception of a valid ICMP response. For example, the predetermined time can be five seconds. Next, in a block 125, the computing device 52 determines if a valid ICMP response was received within the predetermined time. If a valid ICMP response was received within the predetermined time, the process 100 continues in a block 130, else the process 100 continues in a block 145.

In the block 130, the source address of the received ICMP message is checked. If source address of ICMP message is a public IP address, the process 100 continues in a block 135, else the process 100 continues in a block 150.

In the block 135, the IP list length is decremented by one and the process 100 continues in a block 140, in which a number of routing devices learnt value (IP list length) and a router IP address list is stored in a memory of the computing device 52, and the process 100 then ends.

In the block 145, which may follow the block 125, the probe retry count is compared to the max probe retry count. If the probe retry count is less than the max probe retry count, the process 100 continues to a block 155, else the process 100 continues in a block 160.

In the block 150, which may follow the block 130, the source IP of the message is entered into the router IP list array at the address of the current TTL-1, the probe retry count is set to zero and the current TTL value is incremented by one. Following the block 150, the process 100 returns to the block 110.

In the block 155 the probe retry count is incremented by one and the process 100 returns to the block 115. If the block 160 is reached, this indicates that there was not an ICMP response to the UDP probe. The IP list length value is set to the max TTL value and the process 100 continues to the block 140.

Phase 2—Discovery of Routers with UPnP and NATPMP

The routing device 58 60 62 that are learnt to be present between the computing device 52 and the Internet 64 are in the in memory of the computer device 52. In this phase, the computing device sends either a UPnP protocol discovery request messages and/or a NATPMP discovery request messages. Each intermediary routing device can be contacted at the addresses obtained in phase one to query the routing device 58 60 62 about its specific protocol information, which is necessary for adding port forwarding entries.

If the retrieval of any router IP addresses in phase one using ICMP fails, a best-guess discovery procedure is deployed to deduce the IP address of the particular failed routing device 58, 60, 62. The best guess is based on the IP address of the computing device for the first router and on the previous router's Wide Area Network (WAN) IP or Public IP address for the router(s) which are at least two hops away from the computing device. For example, if the IP used for guessing is a.b.c.d, then the router's IP address may be guessed to be a.b.c.1. To further exemplify the best-guess discovery procedure, the routing device 58 has a WAN IP address of 10.10.8.100. Therefore, the best-guess IP address of the router 60 address would be 10.10.8.1, as most routing device's private IP address's least significant octet is usually a one. If the best-guess IP address does not work, port forwarding cannot be accomplished.

Figure 4:
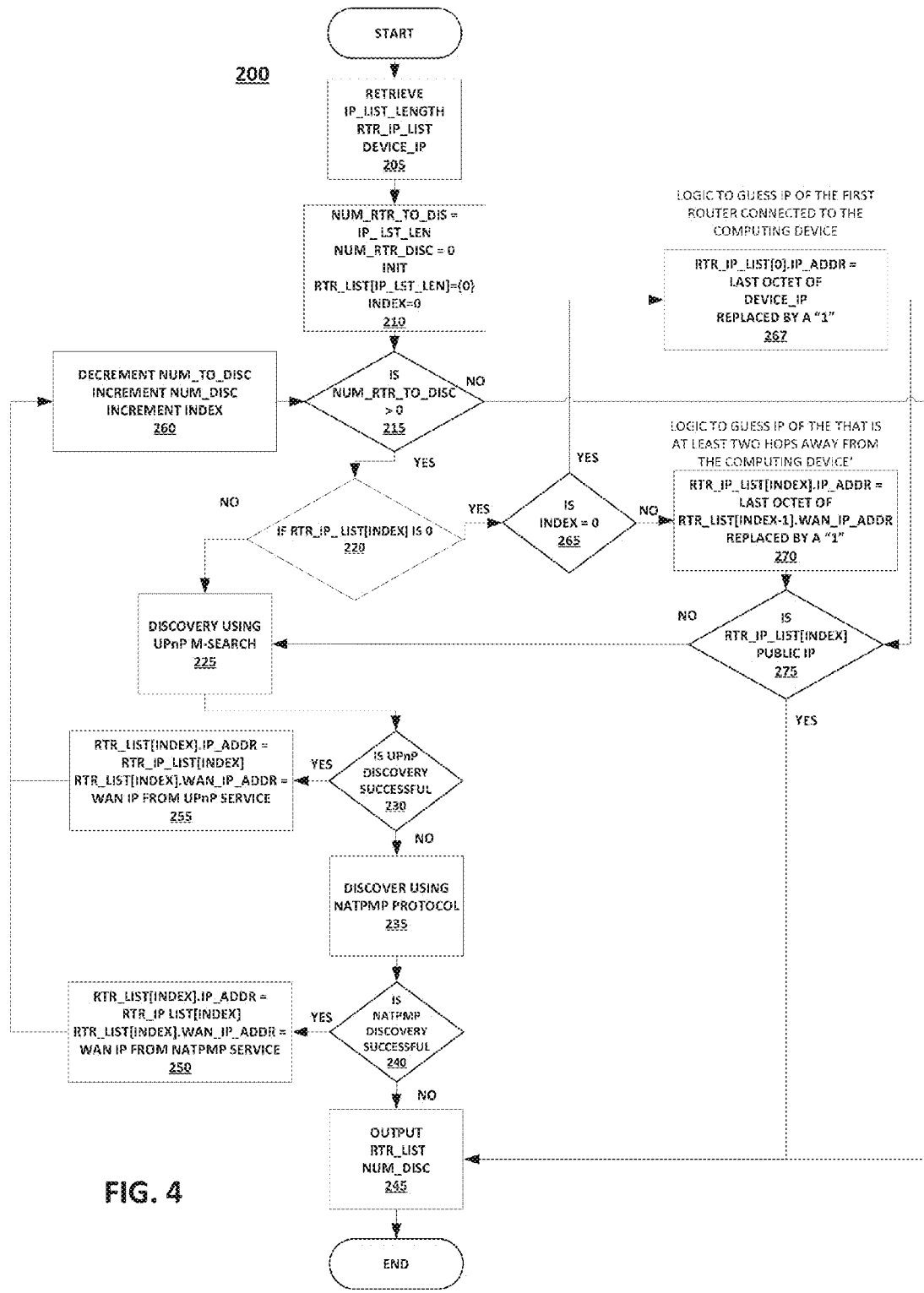
FIG. 4 is an example of a process executed on the computing device of FIG. 1 to discover a list of routers using Universal Plug and Play (UPnP) protocol and/or Network Address Translation Port Mapping Protocol (NATPMP).

FIG. 4 illustrates an example process 200 executed on a computing device 52 using the UDP protocol to query the routing device 58 60 62 about their port forwarding capabilities. For example, to determine if the routing device 58 60 62 between the computing device 52 and the external network 66 use the Universal Plug and Play (UPnP) protocol and/or Network Address Translation Port Mapping Protocol (NATPMP) to configure port forwarding.

The process 200 begins in a block 205, in which the computing device 52 retrieves the IP list length and the router IP list from its memory. Next, in a block 210, a number of router to discover is set to the IP list length, a number of routers discovered value is set to zero, and an array of routers list of IP list length initialized to zero and an index value is set to zero. The process 200 continues in a block 215, where the computing device 52 determines whether the number of routers to discover is greater than zero. If so, the process 200 continues in a block 220, else the process 200 continues in a block 245.

In the block 220 the computing device 52 determines if the IP address at the index of the array of router IP list is zero, then the process 200 continues in a block 265, else the process 200 continues in a block 225.

In the block 225, the computing device 52 sends a UPnP discovery request, e.g., an M-SEARCH message to the routing device 58 60 62 at the IP address provided at the current index of the array of router IP list. The M-SEARCH message is a routing device discovery protocol request sent to a device via the UPnP protocol requesting the available UPnP services available from on the device. If within a UPnP response time interval and in response to the UPnP discovery request, the routing device may reply with a UPnP discovery response. A positive routing device discovery protocol response indicates that the routing device 58 60 62 is a UPnP device can a UPnP protocol to configure port forwarding. A routing device types is then set to UPnP and a set of UPnP protocol information is stored, which may include an Universal Resource Locator. A no (or) negative response indicates the routing device 58 60 62 cannot use UPnP to configure port forwarding.

Next, in a block 230, the computing device 52 determines whether the UPnP discovery in the block 225 was successful. A positive UPnP response may include an InternetGatewayDevice response message. The InternetGatewayDevice response is a Simple Object Access Protocol (SOAP) message in the protocol specification for exchanging structured information in computer networks. If the response was positive the process 200 continues in a block 255, else the process 200 continues in a block 235.

In the block 235, the computing device 52 sends using UDP, a NATPMP discovery request to the routing device 58 60 62 at the IP address of the current index of the array of router IP list to determine if the router can use NATPMP. If within a NATPMP response time interval and in response to the NATPMP discovery request, the routing device may reply with a NATPMP discovery response. A positive routing device discovery protocol response indicates that the routing device 58 60 62 is a NATPMP device can a NATPMP protocol to configure port forwarding. A routing device type is then set to NATPMP and a set of NATPMP protocol information is stored. A no (or) negative response indicates the routing device 58 60 62 cannot use NATPMP to configure port forwarding.

Next, in a block 240, the computing device 52 determines whether the NATPMP discovery in the block 235 was successful. If the response was positive the process 200 continues in a block 250, else the process 200 continues in a block 245.

In the block 245, which may follow any of the blocks 215, 240, or 275, the computing device 52 stores the router list and the number of routing device 58 60 62 discovered in a memory. The process 200 then ends.

In a block 250, which may follow the block 240, the current index of a router list array is populated with the IP address of the current routing device 58 60 62, information that the current router can support NATPMP, a WAN IP address, and any additional NATPMP protocol specific information. In other words, the routers list array will have four pieces of information stored in it at each index value. The process 200 continues to a block 260.

In a block 255, which may follow the block 230, the current index of a router list array is populated with the IP address of the current routing device 58 60 62, information that the current router can support UPnP, a WAN IP address, and NATPMP protocol specific information. In other words, the routers list array will have four pieces of information stored in it at each index value. The process 200 continues to a block 260.

In a block 260, which may follow either of the blocks 250, 255, the number of routers to be discovered is decremented by one and the number of routers discovered is incremented by one. The process 200 then continues in the block 215.

In the block 265, which may follow the block 220, a determination is made regarding the index variable. If the index variable is zero, the process 200 continues in the block 267, else the process 200 continues in a block 270.

In the block 267, which may follow in the block 265, Logic to best guess a first routing device IP address from a computing device LAN IP address is implemented in the block 267. The IP address value to be stored at the current index value of the array of routers IP list is the LAN IP address of the computing device 52 with the least significant octet set to a one.

Logic to best guess the IP address of the router at least two hops away from the computing device based on the previous router's WAN IP address is implemented in the block 270. The IP address value to be stored at the current index value of the array of routers IP list is the WAN IP address of the immediately previous router with the least significant octet set to a one. For example, if the IP address of the immediately previous WAN IP address was 68.25.159.78, the value to be stored at the current index is 68.25.159.1.

The process 200 continues following the block 270 in a block 275. In the block 275, a determination is made if the IP address at the current index value is a private or public IP address. If the IP address is a public IP address, the process 200 continues in the block 245, else the process 200 continues to the block 225. The public IP address is the IP address which indicates that the network is on the open Internet, whereas a private IP address space indicates the network is not on the open Internet.

Phase 3—Configuring Port Forwarding on the Discovered Routers

Once the computing device 52 has determined the IP addresses and the protocol (UPnP or NATPMP) the respective routing device 58 60 62 support, the computing device 52 can add a port entry to the router configuration of each of the discovered routing device 58 60 62. The port entries are added to the routing device 58 60 62 in such a way that an Nth router (router 62) has an entry to forward to the WAN side of the (N−1)th router 60. The (N−1)th router has an entry to forward to the WAN side of the (N−2)th router (routing device 580). The (N−2)th router has an entry to forward to the computing device 52. Table 2 illustrates an example Port forwarding entries required in Router 58, 60 and 62 to forward traffic from Internet on the port 5000 to the Computing device 52 in the private network.

TABLE 2

Port forwarding entries required in Router 58, 60 and 62 to forward traffic from Internet on the port 5000 to the Computing device 52 in the private network

| Router | Internal IP | Port | External IP | Port | Remarks |
|---|---|---|---|---|---|
| 58 | 192.168.1.2 | 5000 | 10.102.8.100 | 5000 | Entry to forward packets to computing device 52 |
| 60 | 10.102.8.100 | 5000 | 172.16.0.128 | 5000 | Entry to forward packets to routing device 58 |
| 62 | 172.16.0.128 | 5000 | 128.118.146.135 | 5000 | Entry to forward packets to router 60 |

Figure 5:
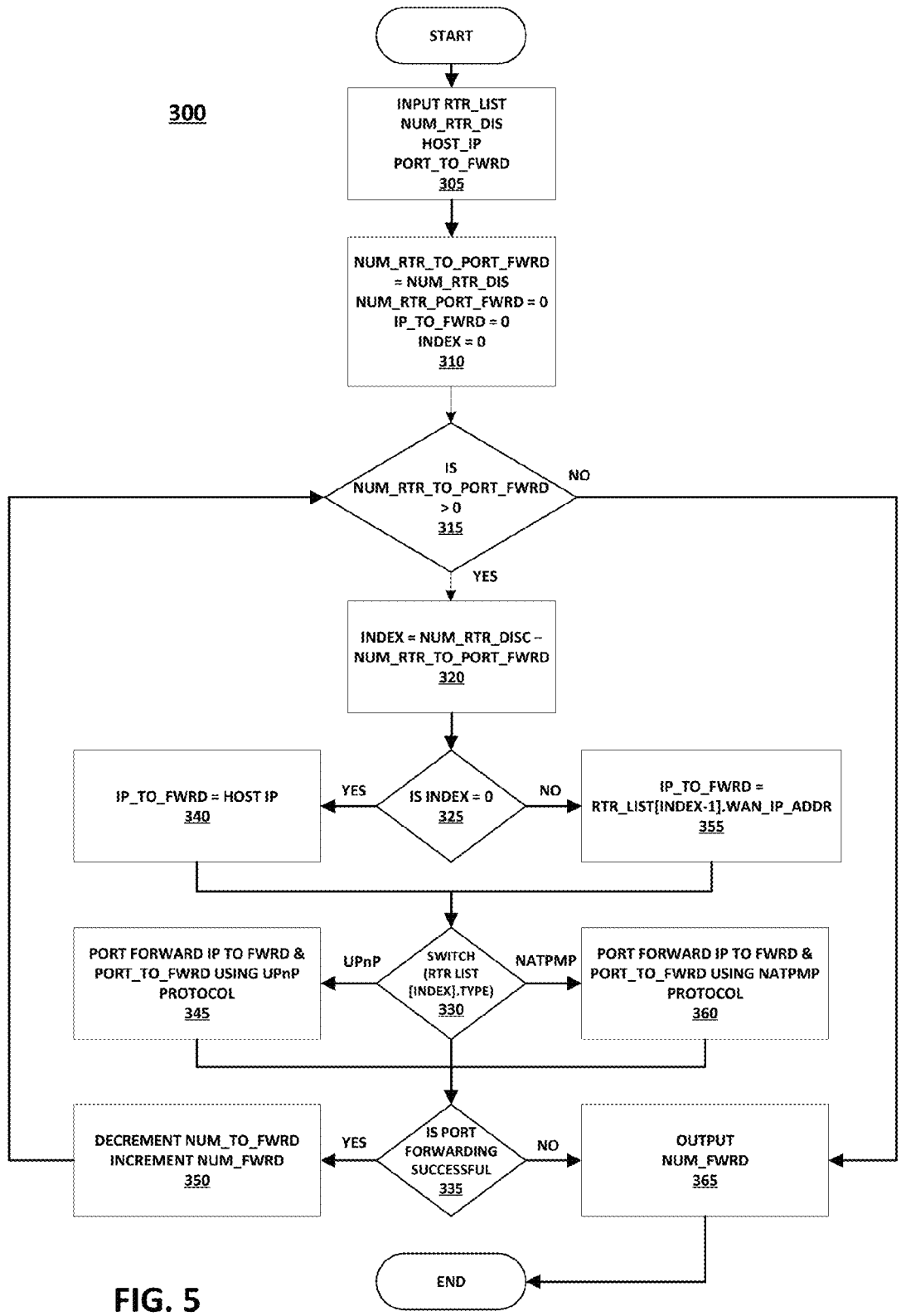
FIG. 5 is an example of a process executed on the computing device of FIG. 1 to configure port forwarding on the routers located between the computing device and the Internet.

FIG. 5 illustrates an example process 300 executed on a computing device 52 to configure port forwarding on the routing device 58 60 62 located between the computing device 52 and the network 62 using UPnP and NATPMP.

The process 300 begins in a block 305 in which the router list array, the number of routers discovered, the host computing device 52 IP address, and the ports to forward is retrieved from computing device 52 memory. Next in a block 310, a number of routers to port forward variable is set to the number of routers discovered. A number of routers port forwarded variable and an IP address to forward variable are set to zero. A process 300 index is also set to zero.

Next in a block 315, the number of routers to port forward is checked to determine if it is greater than zero. If not, all the routers were successfully port forwarded and the process 300 continues in a block 365, else the process 300 continues in a block 320.

In the block 320, the process 300 index is set to the number of routers discovered reduced by the number of routers to port forward. For example, if two routers were discovered and both require port forwarding, the index would be zero.

The process 300 continues in a block 325 in which the process 300 index is compared to zero. If the index is zero, the process 300 continues in a block 340, else the process 300 continues in a block 355.

In the block 340, the computing device 52 IP address is set to the IP address to forward value and the process 300 continues in a block 330. In the block 355, the IP address to forward is set to WAN IP address one less than the current index value of the router list array and the process 300 continues in the block 330.

In the block 330, which follows either the block 340 or the block 355, the protocol type from router list array at the current index value is determined. If the protocol type is UPnP, the process continues in a block 345. If the protocol type is NATPMP, the process 300 continues in a block 360. If the protocol type is neither of the foregoing, the process 300 continues in a block 335.

In the block 345, a port forward instruction is with the IP address to forward and the port to forward configuration is sent to the current routing device 58, 60, 62 using a UPnP instruction with a TCP packet and using any additional UPnP information stored in the router list array required by the computing device 52 to communicate with the routing device 58, 60, 62 via UPnP.

In the block 360, the IP address to forward and the port to forward configuration is sent to the current routing device 58, 60, 62 using a NATPMP instruction with a UDP packet and using any additional NATPMP information stored in the router list array required by the computing device 52 to communicate with the router via NATPMP.

In the block 335, which may follow one of the blocks 345, 330, or 360, a determination is made whether port forwarding was successful, i.e., the routing device 58, 60, 62 sends an affirmative response that the routing device 58, 60, 62 have forwarded the ports. If port forwarding was successful, the process 300 continues in a block 350, else the process 300 continues in the block 365.

In the block 350, the number of routers to forward is decremented by one and the number of routers forwarded is incremented by one. Then, the process 300 returns in the block 315.

In the block 365, which may be reached from either the block 315 or the block 335 as explained above, the number of routers port forwarded is stored in the computing device 52 memory and the process 300 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above.

Computer executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Nonvolatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
    repeating transmission of an Open Systems Interconnection (OSI) network protocol packet to at least one routing device between a computing device and a public network to learn a number of routing devices and an Internet Protocol (IP) address of each at least one routing device between a computing device and a public network;
    sending a routing device discovery protocol request to each at least one routing device;
    receiving a routing device discovery protocol response;
    sending a port forwarding instruction to each at least one routing device based upon the routing device discovery protocol response to allow incoming content from the public network;
    incrementing a Time To Live (TTL) value in each repeating OSI network protocol packet until a public address is reached;
    waiting for an Internet Control Message Protocol (ICMP) Time Exceeded Message;
    parsing the ICMP Time Exceeded Message to obtain the IP address of each at least one routing device, and incrementing a number of routing devices learnt value;
    storing the IP address and the number of routing devices learnt value; and
    resending the OSI network protocol packet with the TTL value set to the TTL value as of when the ICMP Time Exceeded Message was not received or when any other ICMP message is not received.

2. The method of claim 1, wherein the OSI network protocol packet is a User Datagram Protocol (UDP).

3. The method of claim 1, further comprising:
    determining that a ICMP Time Exceeded Message was not received from a first routing device; and
    estimating a first routing device IP address from a Local Area Network (LAN) IP address of the computing device as the routing device IP address.

4. The method of claim 3, further comprising replacing a least significant octet of the first routing device IP address with a one.

5. The method of claim 3, further comprising:
    determining an ICMP Time Exceeded Message was not received from the at least one routing device which is at least two hops from the computing device; and
    estimating the IP address of the at least one routing device which is at least two hops from the computing device from a Wide Area Network (WAN) IP address of the at least one routing device connected to a LAN side of the at least one routing device.

6. The method of claim 5, further comprising replacing the least significant octet of the WAN IP address with a one.

7. The method of claim 5, wherein sending the port forward instruction further comprises:
    sending the port forward instruction to the routing device which is at least two hops away from the computing device to port forward to a WAN IP address of the routing device connected to a LAN side of the routing device; and
    sending the port forward instruction to the first routing device to port forward to a computing device LAN IP address.

8. The method of claim 1, further comprising determining if the Internet is reached by comparing the IP address of the at least one routing device to a public IP address.

9. The method of claim 8, further comprising determining the number of routing device by subtracting one from the TTL value upon determining that the Internet was reached.

10. The method of claim 1, wherein the routing device discovery protocol request is one of a Universal Plug and Play (UPnP) protocol and a Network Address Translation Port Mapping Protocol (NATPMP).

11. The method of claim 1, wherein the port forwarding instruction is one of a UPnP instruction and a NATPMP instruction.

12. The method of claim 1, wherein the routing device is one of a router, a gateway and a bridge.

13. A system, comprising a computing device, the computing device including a processor and a memory, the memory storing instructions executable by the processor to:
repeat transmission of an Open Systems Interconnection (OSI) network protocol packet to at least one routing device between a computing device and a public network to learn a number of routing devices and an Internet Protocol (IP) address of each at least one routing device between a computing device and a public network;
send a routing device discovery protocol request to each at least one routing device;
receive a routing device discovery protocol response;
send a port forward instruction to each at least one routing device based upon the routing device discovery protocol response to allow incoming content from the public network;
issue suing a UPnP discovery request to the IP address of the at least one routing device;
wait a UPnP response time interval for a UPnP discovery response from the at least one routing device;
classify the at least one routing device as a UPnP device and storing a set of UPnP protocol information along with a routing device type in a memory of the computing device when the UPnP discovery response is received;
issue a NATPMP discovery request to the IP address of the at least one routing device;
wait a NATPMP response time interval for a NATPMP discovery response from the at least one routing device; and
classify the at least one routing device as a NATPMP device and storing a set of NATPMP protocol information and the routing device type in the memory of the computing device when the NATPMP discovery response is received.

14. The method of claim 13, wherein the UPnP discovery request is an M-SEARCH message.

15. The method of claim 13, wherein the set of UPnP protocol information includes an Universal Resource Locator.

16. The method of claim 13, wherein the UPnP discovery response includes a InternetGatewayDevice response.

17. A system, comprising a computing device, the computing device including a processor and a memory, the memory storing instructions executable by the processor to:
repeat transmission of an Open Systems Interconnection (OSI) network protocol packet to at least one routing device between a computing device and a public network to learn a number of routing devices and an Internet Protocol (IP) address of each at least one routing device between a computing device and a public network;
send a routing device discovery protocol request to each at least one routing device;
receive a routing device discovery protocol response;
send a port forward instruction to each at least one routing device based upon the routing device discovery protocol response to allow incoming content from the public network;
increment a Time To Live (TTL) value in each repeating OSI network protocol packet until a public address is reached;
wait for an Internet Control Message Protocol (ICMP) Time Exceeded Message;
parse the ICMP Time Exceeded Message to obtain the IP address of each at least one routing device, and increment a number of routing devices learnt value;
store the IP address and the number of routing devices learnt value; and
resend the OSI network protocol packet with the TTL value set to the TTL value as of when the ICMP Time Exceeded Message was not received or when any other ICMP message is not received.

18. The system of claim 17, wherein the routing device discovery protocol request is either a Universal Plug and Play (UPnP) protocol message or a Network Address Translation Port Mapping Protocol (NATPMP) message.

19. The system of claim 17, the memory further storing instruction executable by the processor comprising instructions to:
determine that a ICMP Time Exceeded Message was not received from a first routing device; and
estimating a first routing device IP address from a Local Area Network (LAN) IP address of the computing device as the routing device IP address.

20. The system of claim 19, the memory further storing instruction executable by the processor comprising instructions to:
determine an ICMP Time Exceeded Message was not received from the at least one routing device which is at least two hops from the computing device; and
estimate the IP address the at least one routing device which is at least two hops from the computing device from a Wide Area Network (WAN) IP address of the at least one routing device connected to a LAN side of the at least one routing device.

21. The system of claim 19, the memory further storing instruction executable by the processor comprising instructions to send the port forward instruction by:
sending the port forward instruction to the routing device which is at least two hops away from the computing device to port forward to a WAN IP address of the routing device connected to a LAN side of the routing device; and
sending the port forward instruction to the first routing device to port forward to a computing device LAN IP address.

22. The system of claim 17, the memory further storing instruction executable by the processor comprising instructions to determine if the Internet is reached by comparing the IP address of the at least one routing device to a public IP address.

23. The system of claim 17, the memory further storing instruction executable by the processor comprising instructions to determine the number of routing devices by subtracting one from the TTL value upon determining that the Internet was reached.

* * * * *